(12) United States Patent
Xu et al.

(10) Patent No.: US 9,370,745 B2
(45) Date of Patent: Jun. 21, 2016

(54) FLUE GAS-TREATING METHOD AND APPARATUS FOR TREATING ACIDIC TAIL GAS BY USING AMMONIA PROCESS

(71) Applicant: JIANGSU NEW CENTURY JIANGNAN ENVIRONMENTAL PROTECTION CO., LTD, Nanjing, Jiangsu (CN)

(72) Inventors: Changxiang Xu, Jiangsu (CN); Jing Luo, Jiangsu (CN); Guoguang Fu, Jiangsu (CN); Yanzhong Xu, Jiangsu (CN)

(73) Assignee: JIANGSU NEW CENTURY JIANGNAN ENVIRONMENTAL PROTECTION CO., LTD, Nanjing, Jiangsu (CN)

( * ) Notice: Subject to any disclaimer, the term of this patent is extended or adjusted under 35 U.S.C. 154(b) by 0 days.

(21) Appl. No.: 14/829,905

(22) Filed: Aug. 19, 2015

(65) Prior Publication Data

US 2015/0352486 A1 Dec. 10, 2015

Related U.S. Application Data

(63) Continuation of application No. 14/409,781, filed as application No. PCT/CN2013/074657 on Apr. 24, 2013.

(51) Int. Cl.
*B01D 53/50* (2006.01)
*B01D 53/78* (2006.01)

(52) U.S. Cl.
CPC ............ *B01D 53/502* (2013.01); *B01D 53/504* (2013.01); *B01D 53/78* (2013.01); *B01D 2251/2062* (2013.01)

(58) Field of Classification Search
CPC ........................................ B01D 53/50–53/507
USPC ............................................. 423/243.06, 242
See application file for complete search history.

(56) References Cited

U.S. PATENT DOCUMENTS 3,752,877 A * 8/1973 Beavon ................. C01B 17/164
423/244.09
5,632,967 A 5/1997 Nasato
(Continued)

FOREIGN PATENT DOCUMENTS

CN 1035063 A 8/1989
CN 1080701 C 3/2002
(Continued)

OTHER PUBLICATIONS

International Search Report dated Dec. 26, 2013 received from International Application No. PCT/CN2013/074657.

*Primary Examiner* — Anthony J Zimmer
(74) *Attorney, Agent, or Firm* — Scully, Scott, Murphy & Presser, P.C.

(57) ABSTRACT

A flue gas-treating method for treating acid tail gas by using an ammonia process, comprising the following steps of: 1) controlling the concentration of sulfur dioxide in an acid tail gas entering an absorber to be ≤30,000 mg/Nm³; 2) spraying and cooling with a process water or/and an ammonium sulfate solution in the inlet duct of the absorber or inside the absorber; 3) providing an oxidation section in the absorber, wherein the oxidation section is provided with oxidation distributors for oxidizing the desulfurization absorption solution; 4) providing an absorption section in the absorber wherein the absorption section achieves desulfurization spray absorption by using absorption solution distributors via an absorption solution containing ammonia; the absorption solution containing ammonia is supplied by an ammonia storage tank; 5) providing a water washing layer above the absorption section in the absorber, wherein the water washing layer washes the absorption solution in the tail gas to reduce the slip of the absorption solution; 6) providing a demister above the water washing layer inside the absorber to control the concentration of mist droplets contained in the cleaned tail gas. In the coal chemical industry, the integration of the Claus sulfur recovery process and the ammonia desulfurization technology can reduce the investment of the post-treatment and simplify the operation process, and provide intensive advantages to the environmental control of plants.

12 Claims, 3 Drawing Sheets

(56) References Cited

U.S. PATENT DOCUMENTS

| | | | |
|---|---|---|---|
| 6,063,352 A * | 5/2000 | Risse | C01C 1/247 423/243.06 |
| 6,508,998 B1 | 1/2003 | Nasato | |
| 6,569,398 B2 | 5/2003 | Fenderson | |
| 7,648,692 B2 | 1/2010 | Chow et al. | |
| 7,910,077 B2 | 3/2011 | Chow et al. | |
| 8,178,070 B2 | 5/2012 | Wong et al. | |
| 8,361,432 B2 | 1/2013 | Parekh et al. | |
| 2009/0004070 A1 | 1/2009 | Chow et al. | |
| 2011/0243822 A1 | 10/2011 | Mortson et al. | |

FOREIGN PATENT DOCUMENTS

| | | |
|---|---|---|
| CN | 1382105 | 11/2002 |
| CN | 1164480 C | 9/2004 |
| CN | 1597060 A | 3/2005 |
| CN | 1214090 C | 8/2005 |
| CN | 1251965 C | 4/2006 |
| CN | 2772609 Y | 4/2006 |
| CN | 1960940 A | 5/2007 |
| CN | 1964773 A | 5/2007 |
| CN | 1964774 A | 5/2007 |
| CN | 101094805 A | 12/2007 |
| CN | 101117214 A | 2/2008 |
| CN | 201030298 Y | 3/2008 |
| CN | 201052456 Y | 4/2008 |
| CN | 201109711 Y | 9/2008 |
| CN | 101274204 A | 10/2008 |
| CN | 201129965 Y | 10/2008 |
| CN | 201132102 Y | 10/2008 |
| CN | 201179415 Y * | 1/2009 |
| CN | 100475313 C | 4/2009 |
| CN | 201231130 Y * | 5/2009 |
| CN | 101519192 A | 9/2009 |
| CN | 100553746 C | 10/2009 |
| CN | 101575103 A | 11/2009 |
| CN | 101585511 A | 11/2009 |
| CN | 201380039 Y * | 1/2010 |
| CN | 101637685 A | 2/2010 |
| CN | 101642629 A | 2/2010 |
| CN | 101274750 B | 6/2010 |
| CN | 101274196 B | 12/2010 |
| CN | 101182926 B | 1/2011 |
| CN | 102012034 A | 4/2011 |
| CN | 101456541 B | 5/2011 |
| CN | 101576261 B | 5/2011 |
| CN | 102061206 A | 5/2011 |
| CN | 201944861 U | 8/2011 |
| CN | 102205202 A | 10/2011 |
| CN | 102211762 A | 10/2011 |
| CN | 102380305 A | 3/2012 |
| CN | 102381685 A | 3/2012 |
| CN | 102381686 A | 3/2012 |
| CN | 101791517 B | 5/2012 |
| CN | 101456540 B | 7/2012 |
| CN | 101574614 B | 7/2012 |
| CN | 102631827 A | 8/2012 |
| CN | 101530727 015 | 11/2012 |
| CN | 101955828 B | 11/2012 |
| CN | 102211762 B | 11/2012 |
| CN | 102781823 A | 11/2012 |
| CN | 102847431 A | 1/2013 |
| CN | 102910593 A | 2/2013 |
| CN | 202751942 U | 2/2013 |
| CN | 202754802 U | 2/2013 |
| CN | 202829575 U | 3/2013 |
| CN | 101418246 B | 4/2013 |
| CN | 103112831 A | 5/2013 |
| CN | 202912691 U | 5/2013 |
| CN | 202924730 U | 5/2013 |
| CN | 202953829 U | 5/2013 |
| CN | 102198365 B | 7/2013 |
| CN | 103223292 A | 7/2013 |
| CN | 203159221 U | 8/2013 |
| CN | 102408098 B | 12/2013 |
| CN | 103418223 A | 12/2013 |
| CN | 103482583 A | 1/2014 |
| CN | 203612955 U | 5/2014 |
| CN | 102942162 B | 8/2014 |
| CN | 203781842 U | 8/2014 |
| CN | 103204477 B | 10/2014 |
| CN | 103446859 B | 10/2014 |
| CN | 104138713 A | 11/2014 |
| CN | 104208992 A | 12/2014 |
| CN | 104249995 A | 12/2014 |
| CN | 104258713 A | 1/2015 |
| CN | 103041679 B | 2/2015 |
| CN | 104353258 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 102177089 B | 4/2015 |
| CN | 104528659 A | 4/2015 |
| CN | 104555939 A | 4/2015 |
| CN | 104555940 A | 4/2015 |
| CN | 204233957 U | 4/2015 |
| CN | 103663386 B | 5/2015 |
| CN | 103079993 B | 7/2015 |
| EP | 0 165 609 B1 | 12/1985 |
| WO | WO 2005/075056 A1 | 8/2005 |
| WO | WO 2005/113429 A1 | 12/2005 |
| WO | WO 2006/113935 A2 | 10/2006 |

* cited by examiner

FLUE GAS-TREATING METHOD AND APPARATUS FOR TREATING ACIDIC TAIL GAS BY USING AMMONIA PROCESS

CROSS REFERENCE TO RELATED APPLICATIONS

This application is a continuation of U.S. patent application Ser. No. 14/409,781 filed Dec. 19, 2014, which is a National Stage Entry of International Application No. PCT/CN2013/074657 filed Apr. 24, 2013, the entire contents of which are incorporated herein by reference herein.

FIELD OF THE INVENTION

This invention relates to a purification technology and an apparatus for industrial flue gas such as an acid tail gas (flue gas) or the like in chemical (coal chemical) process. Specifically, the invention relates to a desulfurization technology and an apparatus using ammonia as the absorbent to remove sulfur dioxide from a flue gas and yield a fertilizer as a byproduct. This invention belongs to the technical fields of environmental protection, power and chemical industry or the like.

BACKGROUND OF THE INVENTION

Sulfur dioxide discharged from industrial processes is the major source of acid rain and sulfur dioxide pollution. In order to control sulfur dioxide emission to improve environmental quality, industrial flue gas desulfurization is necessary and must be enforced.

Acid tail gas generally refers to the tail gas generated from the following steps: a sulfur-containing gas generated from the chemical (especially coal chemical) process firstly goes through the recovery process to recover sulfur, phenols, naphthalenes and so on, and then is sent to the incinerator to fully combust the organic compounds and hydrogen sulfide. The main hazardous component in the acid tail gas is high-concentration sulfur dioxide, which needs to be treated in the desulfurization unit in order to meet the emission regulations.

In the coal chemical industry, the Claus sulfur recovery process is usually used for removing hydrogen sulfide and recovering sulfur. In order to ensure that the tail gas meet the emission standards, the SuperClaus, EuroClaus or SCOT technology is usually used to treat the tail gas from the conventional two-stage Claus sulfur recovery unit. All these processes have the disadvantages of complicated process, high investment, high operating cost, difficult operation or the like. For example, CN200710049014 improves the low-temperature Claus sulfur recovery process by mixing an acid gas and air for Claus reactions to take place inside the combustion chamber, and using the process gas from the first stage of the waste heat boiler as the reheating source. This invention contains a gas-gas heat exchanger, which utilizes the process gas at the first stage of waste heat boiler, or the flue gas at the outlet duct of the incinerator at 600° C. as the reheating resource for the subsequent reactors. The second stage to the fourth stage reactors and the third stage to the fifth stage sulfur condensers are controlled by a switching valve program. In each switching cycle, two of the three reactors undergo low-temperature absorption while the other reactor undergoes temperature ramp up, stable regeneration, gradual cooling, and stable cooling. Such control is complicated, and if stable control cannot be achieved, the sulfur recovery efficiency will be greatly affected.

Sodium carbonate and sodium hydroxide are used previously for the removal of sulfur dioxide from acid tail gas in small-scale chemical processes. This method also has the disadvantages of high capital and operating costs, and complicated operation or the like. Coal chemical industry which uses atmospheric fixed-bed gasifier with lump coal as raw material often uses atmospheric pressure desulfurization technology by installing an absorber operated at atmospheric pressure (20 kPa) in the coal gasification process. At present in China, the circulation and regeneration of kauri solution is often used for desulfurization, and then the sulfur recovery devices are used to generate sulfur.

At present, limestone desulfurization is widely used for treating flue gas from coal-fired boilers. Capital and operating costs for limestone desulfurization device are high, and especially, it requires high-quality limestone, and the market for the desulfurization byproduct (gypsum) is limited. Waste water generated from this process has to be disposed. Sodium carbonate and sodium hydroxide desulfurization, which is often used in acid tail gas desulfurization treatment, consumes sodium carbonate and sodium hydroxide, and the market for its byproduct sodium sulfate is limited, resulting in high operating cost and poor reliability.

With the wide applications of ammonia desulfurization technology, the advantages of this method become more and more significant. Benefiting from its advantages such as high efficiency, no secondary pollution, byproduct recycle, simple process, and integrability with boiler flue gas desulfurization, the ammonia desulfurization technology can be applied to more industrial processes. For example, in coal chemical industry, two-stage Claus sulfur recovery can be combined with ammonia desulfurization, achieving over 99.5% desulfurization efficiency\and 95% sulfur recovery. The byproduct ammonium sulfate can be sold directly, there is no secondary pollution, the process is simple and easy to operate, and the capital and operating costs are low. The integrated design combining the byproduct generated from ammonia desulfurization treatment with that from the boiler ammonia desulfurization can further reduce the investment of the post-treatment system and simplify the process flow. This method simplifies the environmental protection emission control in these plants and benefits the plant operation management.

SUMMARY OF THE INVENTION

The purpose of this invention is to provide a method for treating acid tail gas by using an ammonia process and an apparatus thereof. Especially the combination of the Claus process and the ammonia desulfurization technology can effectively improve the acid tail gas desulfurization efficiency, and effectively control the ammonia slip and the aerosol generation. In addition, this process is simple and operating cost is low. The desulfurization efficiency is ≥95%, and the ammonia recovery ratio is ≥96.5%.

Technical Solution of the Invention

The application provides a flue gas-treating method for treating acid tail gas by using an ammonia process and an apparatus thereof, including the following:

1) according to the concentration of sulfur dioxide in the flue gas (tail gas), supplying air to make the concentration of sulfur dioxide reach a suitable absorbing condition; and the acid tail gas ammonia desulfurization treatment is carried out inside the absorber; the concentration of sulfur dioxide to be introduced into the absorber is ≤30,000 $mg/Nm^3$;

2) setting process water spray cooling and/or ammonium sulfate solution spray cooling in the inlet duct of the absorber or inside the absorber to cool and wash the tail gas, so as to make the flue gas meet the absorbing condition of desulfurization. The concentration of ammonium sulfate increases when the ammonium sulfate solution is used for the spray cooling. Such increase makes the ammonium sulfate solution concentrate or even crystallize, and generates products with different concentrations.

3) providing an oxidation section in the absorber, wherein the oxidation section is provided with oxidation distributors for oxidizing the desulfurization absorption solution in order to ensure the oxidation efficiency of the absorption solution to be over 98%.

4) providing an absorption section in the absorber wherein the absorption section achieves desulfurization spray absorption by using absorption solution distributors via an absorption solution containing ammonia. This setting ensures the desulfurization efficiency to be over 95%.

5) providing a water washing layer above the absorption section in the absorber, wherein the water washing layer washes the absorption solution droplets in the tail gas to reduce the slip of the absorption solution as well as to control the water washing flow in order to keep the concentration of the absorption solution.

6) providing a demister above the water washing layer inside the absorber to control the mist droplets concentration in the cleaned tail gas.

Process Flow of the Invention is as Follows

The process of the flue gas-treating method for treating acid tail gas by using an ammonia process and the apparatus is described as follows: the sulfur dioxide concentration of the flue gas is adjusted through supplying air from the air blower 2 at the inlet of the absorber 8. Then the flue gas flows into the absorber 16 after being cooled through the washing cooling spray layer 15 at inlet of the absorber 16 or after being cooled by the cooling spray layer 17 using ammonium sulfate solution inside the absorber. Sulfur dioxide is then removed by washing within the absorption spray layer 13 inside the absorber 16. After the absorption through water washing layer 12 and the removal of mist droplets through the demister 11, the cleaned gas is discharged from the stack 10 through the cleaned gas duct 9.

Cooling of the flue gas can be achieved by supplementing air and spraying process water or/and ammonium sulfate solution.

Furthermore, the circulation of the absorption solution can be a one-stage circulation or a two-stage circulation. If ammonium sulfate solution with low concentration is required to be generated from the absorber, one-stage absorption solution circulation system is adequate. If ammonium sulfate solution with high concentration or ammonium sulfate crystal slurry is required to be generated from the absorber, two-stage absorption solution circulation system shall be used. The functions of the first-stage absorption solution circulation system are absorption and oxidation. The circulation pump 5 draws the absorption solution out from bottom of the absorber to the absorption spray layer 13 inside the absorber for spraying. The absorption solution contacts the process gas inside the absorber to wash and absorb sulfur dioxide, and generate ammonium sulfite. Absorption solution containing ammonium sulfite contacts the oxidation air supplied by the oxidation air blower 1 to the oxidation section 4 at the bottom of the absorber 16 to generate ammonium sulfate after oxidation. Ammonia is supplied from the ammonia solution storage tank 3. The second-stage absorption solution circulation system is a cooling spray (concentration and crystallization) circulation, in which the process gas is cooled by ammonium sulfate solution pumped from the ammonium sulfate solution storage tank 6 into the cooling washing spray layer 17 inside the absorber and/or into cooling washing layer 15 at the inlet of the absorber, and the ammonium sulfate solution evaporates, concentrates or even crystallizes. Solution/slurry generated from the absorber is transported by the ammonium sulfate discharge pump 7, and is used to produce solid ammonium sulfate or the like, or directly used.

Main Parameters in the Invention

Optimal concentration of sulfur dioxide in the process gas entering the absorber is no more than 30,000 mg/Nm$^3$;

Optimal temperature of process gas entering the absorption spray layer of absorber is no more than 80° C.;

Operating temperature of the absorption spray layer inside the absorber is no more than 65° C.;

The temperature of the absorption solution is no more than 65° C.;

The superficial gas velocity is 1.5 m/s to 4 m/s;

The liquid-gas ratio of the cooling and washing liquid is no more than 6 L/m$^3$;

The liquid-gas ratio of the spraying absorption solution is 1 L/m$^3$ to 15 L/m$^3$;

The concentration of the ammonium sulfate solution is no less than 15%.

This invention can be the acid tail gas ammonia desulfurization treatment process following the Claus sulfur recovery process (including refined Claus process and boiler flue gas ammonia desulfurization unit).

The invention provides a flue gas-treatment apparatus for treating acid tail gas by using an ammonia process, comprising an absorber 16, an air blower 2, an ammonia solution storage tank 3, an absorber (a desulfurization tower) oxidation section 4, an absorber recirculation pump 5, an ammonium sulfate storage tank 6, an ammonium sulfate discharge pump 7, an inlet duct of the absorber 8, a cleaned gas duct 9, a stack 10, a demister 11, a water washing layer 12, an absorption spray layer 13 inside the absorber 16, a cooling washing pump 14, an inlet cooling washing spray layer 15 and a spraying pump 17. The inlet duct of the absorber is connected to the air blower 2 and there are cooling and spraying devices 15 and 17 set in the inlet duct of the absorber 16 or inside the absorber with the process water or/and the ammonium sulfate solution. There is an oxidation section 4 set inside the absorber 16, and oxidation distributors are set inside the oxidation section 4 to achieve the oxidation of the desulfurization absorption solution. There is an absorption section 13 set inside the absorber 16, and the absorption section 13 uses absorption distributors to achieve the desulfurization spraying absorption via absorption solution containing ammonia. The oxidation section 4 is equipped with an oxidation blower 1, and the solution generated from the oxidation section 4 is transported into the ammonium sulfate storage tank 6 and transported out of the device by the ammonium sulfate discharge pump 7.

The cooling spray layer 17 is the one with the spraying coverage rate over 200%, while the absorption spray layer 13 uses two to four layers of spray of the spray tower type or the packed tower type, and the spray coverage rate for each layer is more than 250%. The water washing layer 12 of the packed tower type is set above the absorption spray layer 13. The demister 11 is set on the top part of the absorber 16. The cleaned gas duct 9 and stack 10 are directly connected to the absorber 16 from its top.

An air blower 2 of centrifugal type is used to adjust the concentration of acid tail gas, and the pressure and flow rate can be adjusted according to the parameters of the acid tail gas, in order to ensure the concentration of sulfur dioxide in the tail gas to be no more than 30,000 mg/Nm$^3$.

The oxidation air blower 1 is the device to supply oxidation air to oxidize ammonium sulfite into ammonium sulfate. The pressure of the blower is set according to the liquid level of oxidation section and shall be no less than 0.05 MPa. In addition, the flow rate of the oxidation air shall be larger than the 150% of the theoretical value.

The height of the absorber 16 is 20 m to 40 m. The oxidation residence time in the oxidation section 4 is no less than 30 minutes, and gas-liquid distributors of plate/grid-type are set in the oxidation section 4. The superficial gas velocity of the absorber at the absorption spray layer 13, the water washing layer 12, and the demister 11 is 1 m/s to 5 m/s. The demister 11 uses 2-3 baffle plates.

Benefits of the Invention

This invention provides a process scheme of desulfurizing acid tail gas with high efficiency, low investment and full utilization. The integrated design combining the byproduct generated from acid gas ammonia desulfurization unit with the boiler ammonia desulfurization units can reduce investment of the post-treatment system and simplifies the process flow. This method intensifies the environmental control for plants, and benefits the operation management.

Spray cooling with process water and/or the ammonium sulfate solution is set in the inlet duct of the absorber or inside the absorber to cool the acid tail gas entering the absorber to below 125° C., and also to save energy consumed in the evaporation crystallization of ammonium sulfate. In addition, supplying air to achieve a proper acid tail gas concentration broadens the industrial applications of ammonia desulfurization process. For example, in coal chemical industry, if the Claus sulfur recovery process is combined with the ammonia desulfurization technology, over 99.5% desulfurization efficiency and about 95% sulfur recovery efficiency can be achieved. The byproduct ammonium sulfate can be sold directly, there is no secondary pollution, the process is simple and easy to operate, and the capital and operating costs are low. The technology does not require complicated control in the Claus sulfur recovery process or other refined Claus processes. Sulfur that cannot be recovered in the Claus process can be recovered by the method described in this invention, which effectively improves the desulfurization efficiency and controls ammonia slip and aerosol generation. In addition, this process is simple and the operating cost is low. This invention, with excellent performance in terms of desulfurization efficiency and ammonia recovery, provides a novel solution for air pollution control problems such as the haze which happened frequently in China recently. The byproducts of the ammonia desulfurization can be used effectively, making this process more economically viable. The design of the devices in this invention is also simple and reliable. The combination of a cooling spray layer and an absorption spray layer a, as well as a blower with adjustable flow rate make it more convenient to treat acid tail gas in time.

Figure 1:
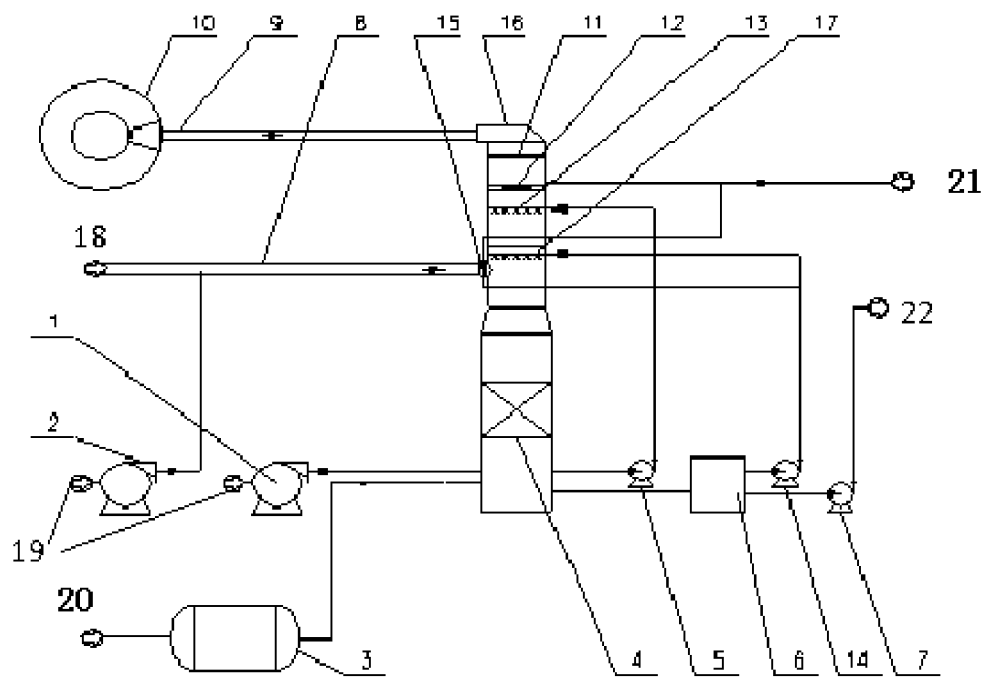
FIG. 1 shows an apparatus and flow chart of this invention.

An oxidation air blower 1, an air blower 2, an ammonium solution storage tank 3, an absorber (desulfurization tower) oxidation section 4, an absorption recirculation pump 5, an ammonium sulfate storage tank 6, an ammonium sulfate discharge pump 7, an inlet duct of the absorber 8, a cleaned gas duct 9, a stack 10, a demister 11, a water washing layer 12, an absorber absorption spray layer 13, a cooling washing pump 14, an inlet cooling washing spray layer 15, an absorber 16, a spraying pump (ammonia solution pump) 17, an acid tail gas inlet 18, air 19, ammonia 20, process water 21, finished ammonium sulfate or semi-finished ammonium sulfate 22.

Detailed Description Of The Invention

The process of this invention can be divided into the following five steps:

A. Adjustment of the Concentration of Sulfur Dioxide in Acid Tail Gas

The sulfur dioxide concentration in the acid tail gas entering the absorber is adjusted according to product specifications, water balance and oxidation velocity, etc., and the concentration is usually no more than 30,000 mg/Nm$^3$, which can be achieved by supplying air to the acid tail gas through the air blower.

B. Cooling of the Acid Tail Gas, and Absorption Solution Concentration (Crystallization)

The temperature of the acid tail gas is usually over 120° C., which shall be cooled down to no more than 80° C. before the sulfur dioxide absorption. The method is using process water and ammonium sulfate solution to wash the tail gas, and a washing layer can be set in the inlet duct of the absorber or inside the absorber. When ammonium sulfate solution is used to reduce the temperature of the acid tail gas, water in the ammonium sulfate solution evaporates to increase the concentration and crystals can even be generated in the solution. Concentration of the product is determined according to the balance and requirements of the process water.

C. Sulfur Dioxide Absorption

Process gas with the temperature between 40° C. and 80° C. or less goes through the absorption reaction after reacting with the absorption solution at the absorption cooling layer of the absorber, and then sulfur dioxide is removed, and ammonium sulfite is generated. The method is circulating the absorption solution by an absorption circulating pump, and then feeding the absorption solution into the oxidation section in the absorber for oxidation.

D. Ammonium Sulfite Oxidation

The oxidation section is set under the absorption spray layer or at the bottom of the absorber. Ammonium sulfite generated from the absorption of sulfur dioxide enters the oxidation section to be oxidized into ammonium sulfate by oxidation air (including air, oxygen-enriched air or pure oxygen). The method is setting oxidation distributors at the oxidation section inside the absorber, and oxidation air is supplied by an oxidation blower. If the concentration of the absorption solution is low, methods such as jet flow or the like can also be used for the oxidation.

E. Washing and Demisting of the Process Gas

Process gas with sulfur dioxide removed contains absorption solution droplets, which shall be washed off by water at the spray layer. Water droplets within the process gas after washing will be removed by the demister above to reduce the water consumption and the impact to the environment.

Characteristics of the Main Devices Related to this Invention:

1) Absorber

Absorber, the core device used in this process, is usually cylindrical, but can also be square or other shapes. From bottom to top, the absorber can be divided into an oxidation section, a cooling and washing layer (a concentration and crystallization section), an absorption spray layer, a water washing layer, and a demister. The superficial gas velocity is 1.5 m/s to 4 m/s.

A) Oxidation Section

Oxidation section can be set at the bottom of the absorber or outside of the absorber, and its diameter and height are determined according to the oxidation demand. Normally, the oxidation residence time is no less than 0.5 h.

Liquid-gas distributors are set inside the oxidation section, so as to ensure good contact between liquid and gas. Devices such as jet flow or the like can also be used for oxidation.

B) Cooling Spray Layer

Cooling spray layer uses water or/and ammonium sulfate solution to cool the acid tail gas. Normally, a water spraying device or/and an ammonium sulfate spraying device are set. The water spraying device is set inside the inlet process gas duct, while the ammonium sulfate spraying device is set on the aforesaid duct or inside the absorber according to the requirement. Coverage rate of the cooling spray layer is more than 200%, the total spraying flow rate is no less than 4 times of water evaporation rate, and the liquid-gas ratio is no less than 6 L/m$^3$.

C) Absorption Spray Layer

Absorption spray layer is set at the middle-upper part of the absorber normally of spray tower type, or of the combination of spray tower type and packed tower type. According to the concentration of sulfur dioxide in the acid tail gas, two to four layers of spray are placed, while the spraying coverage rate of each layer is over 250%.

D) Water Washing Layer

Water washing layer of packed tower type is set above the absorption spray layer. The water flow rate is determined according to water balance.

E) Demister

Demister is set at the top part of the absorber, and demister which can be placed horizontally can also be set in the cleaned gas duct of the absorber. Demister of baffle plate type is usually selected, and regular packing can also be used as demister if there is no ash deposition. The superficial gas velocity of the demister is 3 to 4.5 m/s.

2) Air Blower

Air blower is used to adjust the concentration of sulfur dioxide in the acid tail gas, and centrifugal blower is often used. The air pressure and the flow rate are set depending on the parameters of acid tail gas to ensure the sulfur dioxide concentration of the acid tail gas to be no more than 30,000 mg/Nm3.

3) Oxidation Air Blower

Oxidation air blower is the device to supply oxidation air for oxidizing ammonium sulfite into ammonium sulfate. The pressure of the blower is set according to liquid level of oxidation section, and it is usually no less than 0.05 MPa. In addition, the flow rate shall be 150% of the theoretical value or more.

Example 1

Figure 2:
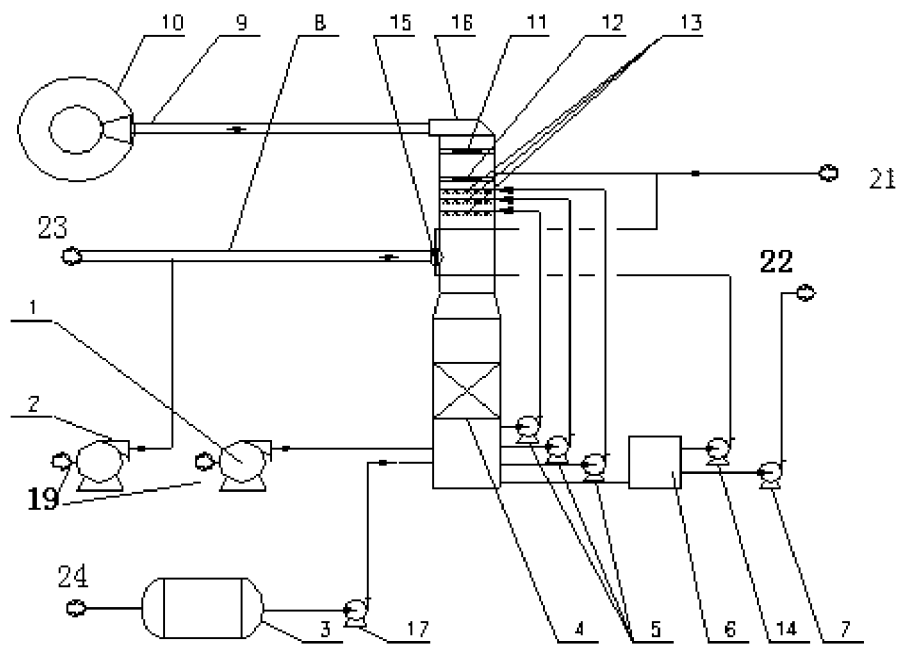
FIG. 2 shows an ammonia desulfurization apparatus and flow chart for treating acid tail gas from a natural gas plant.

FIG. 2 Shows an Ammonia Desulfurization Apparatus for Treating Acid Tail Gas from a Natural Gas Plant The total flow rate of acid tail gas is 13,375 Nm$^3$/h, the temperature is 152° C., the concentration of sulfur dioxide in the acid tail gas is 31,443 mg/Nm$^3$, and the pressure is 100,000 Pa. The absorbent is aqueous ammonia with a concentration of 15%.

Process flow and devices: FIG. 2 shows the process flow diagram and devices. After the acid tail gas is supplemented with ambient-temperature air by the air blower 2, the concentration of sulfur dioxide is decreased to 22,000 mg/Nm$^3$ and the temperature is decreased to 115° C. The temperature of acid tail gas is further decreased to 70° C. at inlet of the absorber by being cooled with process water and ammonium sulfate solution spray layer 15 (process water flow rate is 0.2 m$^3$/h and ammonium sulfate solution flow rate is 20 m$^3$/h). Then the flue gas enters the absorber 16 to be sprayed with absorption solution. Then the process gas is cleaned by three absorption solution spray layers 13, and absorption solution flow rate is 40 m$^3$/h in each layer. The sulfur dioxide concentration is decreased to 60 mg/Nm$^3$ (86 mg/Nm$^3$ under the conditions of the original acid tail gas with 99.7% desulfurization efficiency). Process gas at 47° C. is then cleaned by water washing layer 12, demisted by demister 11, and then discharged from stack 10.

The absorption solution with sulfur dioxide absorbed is oxidized to ammonium sulfate solution by oxidation air from the oxidation air blower 1 in the oxidation section 4 at the bottom of the absorber. Ammonium sulfate solution flows into the ammonium sulfate storage tank 6, and transported by the ammonium sulfate discharge pump into ammonium sulfate system of the boiler flue gas ammonia desulfurization plant Ammonia from the ammonia solution storage tank 3 is pumped into the bottom of the absorber by the ammonia solution pump 17 to adjust the pH of the absorption solution.

Main Features of Devices:

The absorber 16 is made of 316L stainless steel with the total height of 29 m.

Diameter of the oxidation section 4 is 4 m and the gas-liquid distributors is of grid type. The absorption spray layer 13, with a diameter of 2 m, has three layers of spraying distributors and each layer has 3 spray nozzles. Diameter of water washing layer 12 is 2 m with 200 mm of corrugated packaging.

Diameter of the demister 11 is 2 m with two baffle plates and the material is enhanced PP. The type of the air blower 2 is centrifugal blower made of carbon steel with rated flow of 7,000 Nm$^3$/h and rated output pressure of 2,500 Pa. Two air blowers are required, with one for redundancy. The ammonia solution storage tank 3 is made of carbon steel and the volume is 50 m$^3$.

Te ammonia solution pump 17 is made of stainless steel with the rated flow of 4 m$^3$/h.

The oxidation air blower 1 is a piston-type air compressor with rated flow of 15 m$^3$/min and rated output pressure of 2.0 MPa. Two air blowers are required with one for redundancy.

The absorption circulation pump is made of 316L stainless steel with rated flow of 40 m$^3$/h. Three absorption circulation pumps are required, and each absorption recycle pump covers to one layer of absorption spraying distributors.

Operation Parameters and Results: 15% ammonia solution is consumed at 1,531 kg/h, and 25% ammonium sulfate solution is produced at 3,460 kg/h, and the ammonia recovery efficiency is 97%.

The sulfur dioxide concentration in the cleaned gas is 60 mg/Nm$^3$ (the concentration is 86 mg/Nm$^3$ under the condition of acid tail gas and the desulfurization efficiency is 99.7%).

The process flow diagram of the ammonia desulfurization for treating acid tail gas from a natural gas plant shown in FIG. 2 also includes acid tail gas 23 and ammonia solution 24 from the natural gas plant.

Example 2

The Ammonia Desulfurization Apparatus for Treating Tail Gas from the Claus Sulfur Recovery Process from a Coal Chemical Plant Acid tail gas from the Claus sulfur recovery unit of a coal chemical plant is generated from acid gas after going through a two-stage Claus sulfur recovery process, a tail gas incinerator and a waste heat boiler. The total flow rate of acid tail gas is 59,912 Nm$^3$/h, the temperature is 165° C., the concentration of sulfur dioxide in the acid tail gas is 12,600 mg/Nm$^3$, and the oxygen concentration is 2% and the pressure is 0.02 MPa. The absorbent is 99.6% anhydrous ammonia.

Figure 3:
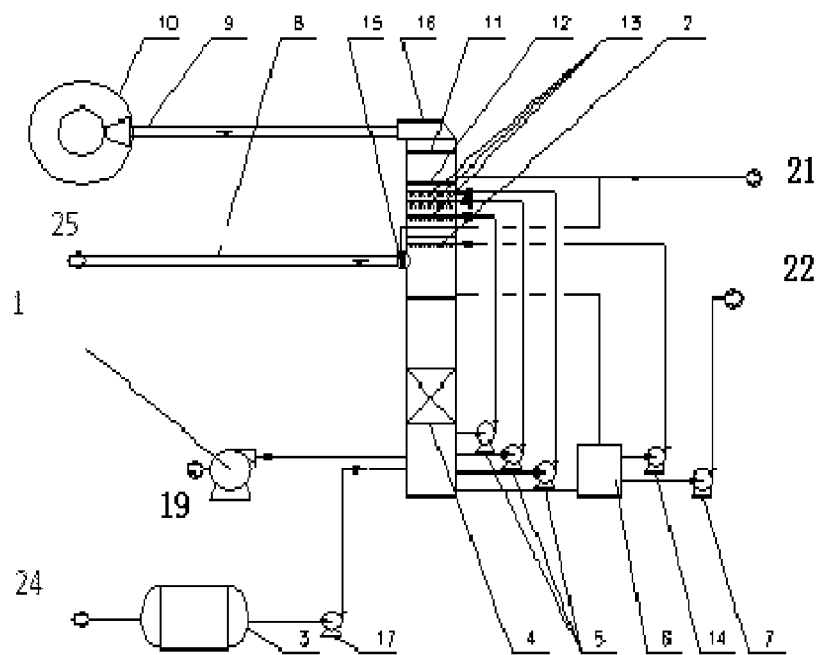
FIG. 3 shows an ammonia desulfurization apparatus and flow chart for treating acid tail gas from the Claus sulfur recovery process in a coal chemical plant.

Process Flow: FIG. 3 shows the process flow chart. The acid tail gas flows into the absorber 16 after being cleaned and cooled to around 100° C. by process water (1 m$^3$/h) spray layer 15 at the inlet of the absorber, and then the gas is cleaned by the washing and cooling spray layer 2 (ammonium sulfate solution, 120 m$^3$/h) inside the absorber. After the process gas is cooled to about 70° C., the process gas enters the upper part of the absorber 16, and is cleaned by three absorption spray layers 13, and absorption solution flow rate at each layer is 140 m$^3$/h. The sulfur dioxide concentration is decreased to 80 mg/Nm$^3$ with the desulfurization efficiency of 99.4%. Process gas with the temperature of 47° C. is cleaned by the water cleaning layer 12, and eliminated droplets by the demister 11 and then discharged from the stack 10.

After absorbing sulfur dioxide, the absorption solution is oxidized into ammonium sulfate solution by the oxidation air from the oxidation air blower 1 at the oxidation section 4 at the bottom of the absorber. Ammonium sulfate solution enters ammonium sulfate storage tank 6, and is then pumped by the cooling washing pump 14 to the washing and cooling spray layer 2 inside the absorber to clean the process gas. After the washing and cooling processes, ammonium sulfate flows back to the ammonium sulfate storage tank 6.

The concentration of ammonium sulfate in the absorption solution at the oxidation section is controlled around 20%, while that in the ammonium sulfate tank is around 45%. The output is transported into the ammonium sulfate evaporation and crystallization device in the plant by the ammonium sulfate discharge pump for the production of solid ammonium sulfate.

Anhydrous ammonia from the anhydrous ammonia storage tank 3 is pumped into the absorber by the liquid ammonia pump 17 (or by its own pressure if the temperature is high enough) to adjust the pH of the absorption solution.

Main Features of Devices

The absorber 16 is made of carbon steel with a glass flake lining for anti-corrosion. It is 32 m in height and the diameter is 4 m.

Gas-liquid distributors are set inside the oxidation section 4. A washing and cooling spray layer 2 is set inside the absorber with four spray nozzles at each layer. An absorption spray layer 13 with three layers of spraying distributors are set at the upper part of the washing and cooling spray layer 2, and each layer has 5 spray nozzles. Absorption spray layer 13 is separated from the washing and cooling spray layer 2 by air cap.

A 200 mm of corrugated packing is set in the water washing layer 12.

Demister 11 uses two layers of baffle plates with the material of enhanced PP.

The ammonia solution storage tank 3 is made of carbon steel with the volume of 50 m$^3$.

The ammonia solution pump is made of stainless steel with the rated flow of 4 m$^3$/h.

Air blower 1 is a screw air compressor with the rated flow of 40 m$^3$/min, and the rated output pressure is 2.0 MPa. Two air blowers are required, as one is working while the other one is standing by.

The absorption circulation pump is made of 2605 stainless steel with the rated flow of 140 m$^3$/h. Three absorption circulation pumps are required, and each absorption recycle pump covers to one layer of absorption spraying distributors.

The cooling washing pump is made of 2605 stainless steel with the rated flow of 120 m$^3$/h. Two pumps are required, as one is working while the other one is standing by.

Operation Parameters and Result: 99.6% anhydrous ammonia is consumed at 412 kg/h, 45% ammonium sulfate solution is produced at 3,438 kg/h, and the ammonia recovery efficiency is 97.1%. The concentration of sulfur dioxide in the cleaned gas is 80 mg/Nm$^3$ with the desulfurization efficiency of 99.4%.

The process flow diagram of the ammonia desulfurization process for treating the acid tail gas from the Claus sulfur recovery process of a coal chemical plant shown FIG. 3 also includes coal chemical Claus sulfur recovery acid tail gas 25 and liquid ammonia 24.

Example 3

Ammonia Desulfurization Devices for Treating Acid Tail Gas from a Chemical Project Acid gas with sulfur and organic waste liquid generated from a chemical project is burned inside a incinerator, and the heat is recycled by a waste heat boiler to produce the byproduct steam, and then generates acid tail gas with sulfur dioxide. The total acid tail gas flow rate is 11,018 Nm$^3$/h, the temperature is 350° C., the concentration of sulfur dioxide is 2.57% (v%), that the concentration of oxygen is 6.22%, and the the pressure is 5,000 Pa.

The absorbent is 99.6% anhydrous ammonia.

Figure 4:
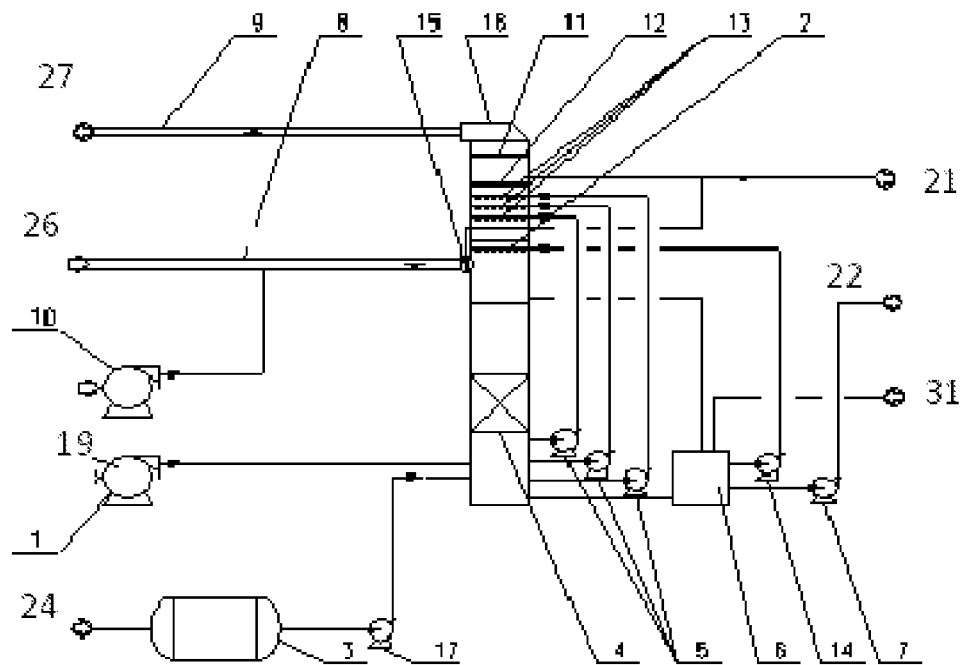
FIG. 4 shows an ammonia desulfurization apparatus and flow chart for treating chemical acid tail gas.

Process Flow: FIG. 4 shows the process flow chart. The concentration of sulfur dioxide in acid tail gas is reduced to 6680 mg/Nm$^3$ after the supplement of ambient-temperature air from the air blower 10, and then the temperature is decreased to 60° C. The acid tail gas is cleaned and cooled by spraying process water (0.5 m$^3$/h) in the spray layer 15 at inlet of the absorber, and then the process gas goes into the absorber 16, and is cleaned by the washing and cooling spray layer 2 (the flow of ammonium sulfate solution is 140 m$^3$/h) inside the absorber. After the process gas is cooled to around 50° C., the process gas enters the upper part of the absorber 16, and is cleaned by three absorption spray layers 13, and the spray rate of the absorption solution at each layer is 160 m$^3$/h. The concentration of sulfur dioxide is then reduced to 30mg/Nm$^3$ (the concentration is 321 mg/Nm$^3$ under the acid tail gas condition with desulfurization efficiency of 99.6%). Process gas at 48° C. is cleaned by the water cleaning layer 12 and demisted by the demister 11 before being discharged from the stack 10.

The absorption solution which has absorbed sulfur dioxide is oxidized to ammonium sulfate solution by oxidation air from the oxidation air blower 1 in the oxidation section 4 at the bottom of the absorber. Ammonium sulfate solution enters the ammonium sulfate storage tank 6, and then is pumped by the cooling washing pump 14 to the washing and cooling spray layer 2 inside the absorber to clean process gas. After the washing and cleaning processes, ammonium sulfate flows back to the ammonium sulfate storage tank 6.

The ammonium sulfate concentration in the absorption solution at the oxidation section is controlled at around 30%, while the concentration of solid ammonium sulfate in the absorption solution of ammonium sulfate tank is around 10%. The output is transported by the ammonium sulfate discharge pump to the plant for solid-liquid separation in post-treatment system. The mother liquor generated from the solid-liquid separation in post-treatment system is sent back to the ammonium sulfate storage tank 6 for circulation crystallization.

Anhydrous ammonia from the ammonia storage tank 3 is pumped into the absorber by the liquid-ammonia pump 17 (or by its own pressure if the temperature is high enough) to adjust pH of the absorption solution.

Main Features of the Devices

The absorber 16 is made of carbon steel with glass flake lining for anti-corrosion. It is 31 m in height and the diameter is 4.8 m. Gas-liquid distributors are set inside the oxidation section 4.

A washing and cooling spay layer 2 is set inside the absorber with nine spray nozzles at each layer. An absorption spray layer 13 with three-layer spraying distributors is equipped at the upper part of washing and cooling spray layer 2, and each layer has 11 spray nozzles. The absorption spray layer 13 is separated from the washing and cooling spray layer 2 by air cap. The water washing layer 12 has a ripple packing in 200 mm. Demister 11 uses two layers of baffle plates with enhanced PP.

The ammonia solution storage tank 3 is made of carbon steel with the volume of 120 m$^3$. Two tanks are required with one for redundancy.

The material of ammonia solution pump 17 is stainless steel with the rated flow of 1 m$^3$/h. The air blower 1 is a roots compressor with the flow rate of 50 m$^3$/min, and the rated output pressure of 0.15 MPa. Two pieces are needed with one for redundancy. The material of absorption circulation pump is 2605 stainless steel with the rated flow of 160 m$^3$/h. Three pieces are needed with one absorption circulation pump corresponding to one layer of absorption spraying distributors. The material of cooling washing pump is 2605 stainless steel with the rated flow of 140 m$^3$/h. Two pieces are required, as one is working while the other one is standing by.

Operation parameters and result: 99.6% anhydrous ammonia is consumed at 431 kg/h, solid ammonium sulfate is produced at 1618 kg/h, and the ammonia recovery efficiency is 97.1%.

The concentration of sulfur dioxide in the cleaned gas is 30 mg/Nm$^3$, while that of sulfur dioxide under the condition of acid tail gas is 321 mg/Nm$^3$, and the desulfurization efficiency is 99.6%.

The process flow diagram of ammonia desulfurization for treating chemical acid tail gas shown in FIG. 4 also includes mother liquor 31 in the ammonium sulfate post-process system, and the cleaned gas discharge 27.

Example 4

An Ammonia Desulfurization Apparatus for Treating Acid Tail Gas from the Claus Sulfur Recovery Process from an Oil Refinery Acid tail gas from the Claus sulfur recovery unit of an oil refinery is generated from acid gas after going through a two-stage Claus sulfur recovery process, a tail gas incinerator, and a waste heat boiler. The total acid tail gas flow rate is 61,221 Nm$^3$/h, the temperature is 160° C., the concentration of sulfur dioxide in acid tail gas is 10,200 mg/Nm$^3$, the oxygen concentration is 7%, and the pressure is 0.02 MPa. The absorbent is 99.6% anhydrous ammonia.

Figure 5:
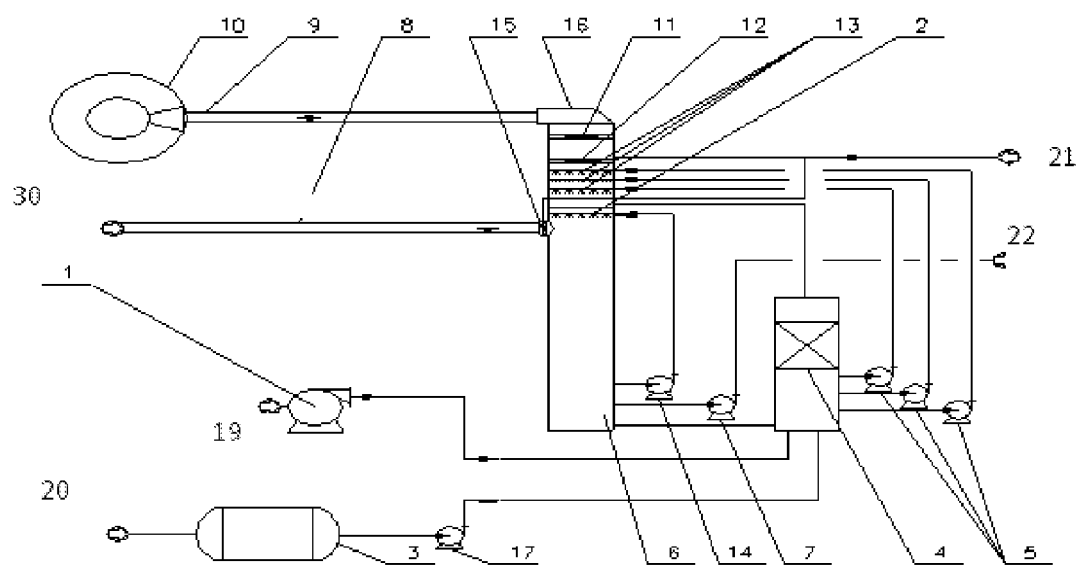
FIG. 5 shows an ammonia desulfurization apparatus and flow chart for treating acid tail gas with Claus sulfur recovery of an oil refinery.

Process flow: Please refer to FIG. 5 for ammonia desulfurization flow chart for the tail gas with the Claus sulfur recovery process from an oil refinery. The acid tail gas is cleaned and cooled by the process water (at 1 m$^3$/h) spray layer 15 at the inlet of the absorber with temperature lowering to around 100° C., and then flows into the absorber 16. After that, the process gas is cleaned by washing and cooling spray layer 2 (ammonium sulfate solution is at 120 m$^3$/h) inside the absorber. After the temperature of process gas is reduced to around 70° C., the process gas flows into the upper part of the absorber 16, and is cleaned by three absorption spray layers 13, and the flow rate of the absorption solution at each layer is 140 m$^3$/h. The concentration of sulfur dioxide is reduced to 80 mg/Nm$^3$ with the desulfurization efficiency of 99.2%. The process gas with the temperature of 46° C. is cleaned by the water cleaning layer 12, and eliminated mist droplets by the demister 11 before being discharged out of the stack 10.

The absorption solution with sulfur dioxide absorbed is oxidized to ammonium sulfate solution by oxidation air from the oxidation air blower 1 in the oxidation section 4 at the bottom of the absorber. Ammonium sulfate solution enters the ammonium sulfate storage tank 6, and then is pumped by the cooling washing pump 14 to the washing and cooling spray layer 2 inside the absorber to clean the process gas. After the washing and cooling processes, ammonium sulfate flows back to the ammonium sulfate storage tank 6.

The concentration of ammonium sulfate in the absorption solution at the oxidation section is controlled at around 20%, while that in the ammonium sulfate tank is around 45%. The 45% ammonium sulfate solution is transported to the ammonium sulfate evaporation and crystallization unit by the ammonium sulfate discharge pump for solid ammonium sulfate production.

Anhydrous ammonia from the ammonia storage tank 3 is pumped into the absorber by the ammonia pump 17 (or by its own pressure if the temperature is high enough) to adjust the pH of the absorption solution.

Main Features of Devices

The absorber 16 is made of carbon steel with glass flake lining for anti-corrosion. The absorber is 24 m in height and the diameter is 4 m.

A washing and cooling spay layer 2 is set inside the absorber with four spray nozzles at each layer. An absorption spray layer 13 with three layers of spraying distributors is set at the upper part of the washing and cooling spray layer 2, and each layer has 5 spray nozzles. The absorption spray layer 13 is separated from the washing and cooling spray layer 2 by air cap.

A 200 mm corrugate packing is set in the water washing layer 12.

Demister 11 uses in two baffle plates with the material of enhanced PP.

The ammonia solution storage tank 3 is made of carbon steel with the volume of 50 m$^3$.

The ammonia solution pump 17 is made of stainless steel with the rated flow of 4 m$^3$/h.

The air blower 1 is a screw air compressor with the rated flow of 40 m$^3$/min, and the rated output pressure is 2.0 MPa. Two air blowers are required, as one is working while the other one is standing by.

The absorption circulation pump is made of 2605 stainless steel with the rated flow of 140 m$^3$/h. Three absorption circulation pumps are required, and each absorption recycle pump covers to one layer of absorption spraying distributors.

The cooling washing pump is made of 2605 stainless steel with the rated flow of 120 m$^3$/h. Two pumps are required, as one is working while the other one is standing by.

The oxidation tank is made of carbon steel with glass flake lining for anti-corrosion. It is 4.5 m in height and the diameter is 10 m. Gas-liquid distributors are set in the oxidation tank 4.

Operation Parameters and Result 99.2% anhydrous ammonia is consumed at 341 kg/h, 45% (weight) ammonium sulfate solution is produced at 2,840 kg/h, and the ammonia recovery efficiency is 97.3%.

The sulfur dioxide concentration of the cleaned gas is 80 mg/Nm$^3$ with removal efficiency of 99.2%. Acid tail gas 30 from the sulfur recovery incinerator is also included in FIG. 5.

The invention claimed is:

1. A flue gas-treating method for treating acid tail gas by an ammonia absorption process, the process comprising:
   1) flowing raw tail gas into an inlet duct of an absorber, and adding air into the raw tail gas via an air blower, which is connected to the inlet duct, to make the concentration of sulfur dioxide in said raw tail gas reach a concentration of <30,000 mg/Nm$^3$, before the tail gas flows into the absorber;
   2) cooling and washing the tail gas by spraying the tail gas in a cooling washing spray layer with water and/or ammonium sulfate solution produced in an oxidation section, wherein said cooling washing spray layer is in the inlet duct of the absorber or inside the absorber, and wherein the concentration of the ammonium sulfate solution increases when spraying the tail gas with ammonium sulfate solution;
   3) desulfurizing the tail gas in an absorption section of the absorber by spraying the tail gas via absorption solution distributors with absorption solution containing ammonia supplied by an ammonia storage tank, wherein the desulfurizing step generates desulfurization absorption solution containing ammonium sulfite;
   4) removing absorption solution droplets from the desulfurized tail gas by washing the desulfurized tail gas with water in a water washing layer above the absorption section in the absorber:
   5) removing droplets from the desulfurized and washed tail gas by treating the desulfurized and washed tail gas with a demister above the water washing layer inside the absorber; and
   6) oxidizing the desulfurization absorption solution produced in step 3) by treating the desulfurization absorption solution in an oxidation section in the absorber set under the absorption section of the absorber, wherein said oxidation section contains oxidation distributors to oxidize ammonium sulfite in the desulfurization absorption solution to ammonium sulfate.

2. The flue gas-treating method of claim 1, further comprising pumping the oxidized desulfurization absorption solution produced in step 6) into the cooling washing spray layer in step 2) inside the absorber and/or in the inlet duct of the absorber to result in concentration of the oxidized desulfurization absorption solution.

3. The flue gas-treating method of claim 1, wherein the temperature of the acid tail gas flowing into the absorption section in the absorber is <80° C., the operating temperature of the absorption section in the absorber is <65° C., and the temperature of absorption solution is <65° C.

4. The flue gas-treating method of claim 3, wherein the superficial gas velocity is 1.5 m/s to 4 m/s, the liquid gas ratio of the cooling absorption solution is <6 L/m$^3$, the liquid gas ratio of absorption section is 1 L/m$^3$ to 15 L/m$^3$, and the concentration of the ammonium sulfate solution is >15%.

5. The flue gas-treating method of claim 1, wherein the acid tail gas flowing into the inlet duct of the absorber in step 1) is from a Claus sulfur recovery process, and the cooling process is achieved by air supplement, water cooling and/or ammonium sulfate solution cooling.

6. A flue gas-treating apparatus for treating acid tail gas by an ammonia absorption process, the apparatus comprising an absorber (16), an air blower (2), an ammonia solution tank (3), an absorber oxidation section (4), an absorption circulation pump (5), an ammonium sulfate storage tank (6), an ammonium sulfate discharge pump (7), an inlet duct (8) of the absorber, a cleaned gas duct (9), a stack (10), a demister (11), a water washing layer (12), an absorber absorption spray layer (13), a cooling washing pump (14), an inlet cooling washing spray layer (15), and a spraying pump (17), wherein the inlet duct (8) is connected to the air blower (2); a process water or/and ammonium sulfate solution cooling and spraying device is set in the inlet duct of the absorber or inside the absorber; an oxidation section (4) is provided in the absorber (16), wherein the oxidation section (4) is provided with oxidation distributors for oxidizing the desulfurization absorption solution; an absorption section is provided in the absorber (16) wherein the absorption section (13) achieves desulfurization spray absorption by using absorption solution distributors via an absorption solution containing ammonia; an oxidation blower (1) is provided in the oxidation section (4); a solution generated by the oxidation section (4) is transported into the ammonium sulfate storage tank (6) and transported out of the apparatus by an ammonium sulfate discharge pump (7); and the absorption spray layer (13) consists of two to four spray tower layers or packed tower layers.

7. The flue gas-treating apparatus of claim 6, wherein the water washing layer of a packed tower is provided above the absorption spray layer, the demister is set at the top of the absorber, and the cleaned gas duct and stack are provided above the absorber.

8. The flue gas-treating apparatus of claim 6, wherein said blower is a centrifugal air blower that adjusts the concentration of acid tail gas by supplying air, and the pressure and flow amount thereof are set according to the parameters of the acid tail gas to ensure the concentration of sulfur dioxide in the tail gas before the tail gas flows into the absorber to be no more than 30,000 mg/Nm$^3$.

9. The flue gas-treating apparatus of claim 6, wherein said air blower supplies air to oxidize ammonium sulfite to ammonium sulfate, wherein the pressure of the air blower is set according to the liquid level of the oxidation section and is no less than 0.05 MPa, and the flow rate of the oxidation air is more than 150% of a theoretical value.

10. The flue gas-treating apparatus for treating acid tail gas by using an ammonia process according to claim 6, wherein the height of the absorber is 20 m to 40 m; the oxidation residence time in the oxidation section is over 30 minutes; the superficial gas velocity at the absorption spray layer, the water washing layer, and the demister is 1 m/s to 5 m/s; and the demister has 2 to 3 baffle plates.

11. The flue gas-treating apparatus of claim 9, wherein a centrifugal air blower is used to adjust the concentration of acid tail gas by supplying air, and the pressure and flow amount thereof are set according to the parameters of the acid tail gas to ensure the concentration of sulfur dioxide in the tail gas to be no more than 30,000 mg/Nm$^3$.

12. The flue gas-treating apparatus of claim 9, wherein the height of the absorber is 20 m to 40 m; the oxidation residence time in the oxidation section is over 30 minutes; the superficial gas velocity at the absorption spray layer, the water washing layer, and the demister is 1 m/s to 5 m/s; and the demister has 2 to 3 baffle plates.

* * * * *